(12) United States Patent
Suciu et al.

(10) Patent No.: US 8,490,411 B2
(45) Date of Patent: Jul. 23, 2013

(54) AXIAL ACCESSORY GEARBOX

(75) Inventors: Gabriel L. Suciu, Glastonbury, CT (US); Christopher M. Dye, Glastonbury, CT (US); Hung Duong, Unionville, CT (US); Nathan Snape, Tolland, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 13/103,152

(22) Filed: May 9, 2011

(65) Prior Publication Data

US 2012/0117982 A1    May 17, 2012

Related U.S. Application Data

(63) Continuation-in-part of application No. 12/948,051, filed on Nov. 17, 2010.

(51) Int. Cl.
*F02C 7/275* (2006.01)
(52) U.S. Cl.
USPC ............................................. 60/802; 60/788
(58) Field of Classification Search
USPC .......................................... 60/802, 788, 786
See application file for complete search history.

(56) References Cited

U.S. PATENT DOCUMENTS

| | | | |
|---|---|---|---|
| 2,803,943 A | 8/1957 | Rainbow | |
| 2,978,869 A * | 4/1961 | Hiscock et al. | 60/802 |
| 3,455,182 A | 7/1969 | Kelley | |
| 4,437,627 A | 3/1984 | Moorehead | |
| 4,525,995 A | 7/1985 | Clark | |
| 5,233,886 A * | 8/1993 | Bossler, Jr. | 74/665 F |
| 5,410,870 A | 5/1995 | Brault et al. | |
| 5,687,561 A | 11/1997 | Newton | |
| 6,357,220 B1 | 3/2002 | Snyder et al. | |
| 6,364,249 B1 | 4/2002 | Morgan et al. | |
| 6,851,267 B2 | 2/2005 | Bruno et al. | |
| 7,500,365 B2 * | 3/2009 | Suciu et al. | 60/802 |
| 2002/0084120 A1 | 7/2002 | Beasley | |
| 2005/0150204 A1 | 7/2005 | Stretton et al. | |
| 2006/0248900 A1 * | 11/2006 | Suciu et al. | 60/802 |
| 2009/0188334 A1 | 7/2009 | Merry et al. | |
| 2009/0290976 A1 | 11/2009 | Suciu et al. | |
| 2010/0107650 A1 | 5/2010 | Ress, Jr. et al. | |

FOREIGN PATENT DOCUMENTS

| | | |
|---|---|---|
| EP | 2216530 | 2/2010 |
| EP | 2372129 | 3/2010 |
| EP | 2390486 | 5/2011 |
| EP | 2405116 | 6/2011 |
| EP | 2455597 | 11/2011 |
| GB | 626036 | 7/1949 |

OTHER PUBLICATIONS

European Search Report, Sep. 21, 2012.
European Search Report, Sep. 21, 2012 for EP12167176.

* cited by examiner

*Primary Examiner* — Phutthiwat Wongwian
*Assistant Examiner* — Vikansha Dwivedi
(74) *Attorney, Agent, or Firm* — Carlson, Gaskey & Olds PC

(57) ABSTRACT

An accessory system for a gas turbine engine includes a main case which defines an accessory gearbox axis. A cover is removably mountable to the main case and a first gear set at least partially within the cover along a first accessory axis transverse to the accessory gearbox axis.

18 Claims, 10 Drawing Sheets

AXIAL ACCESSORY GEARBOX

REFERENCE TO RELATED APPLICATIONS

The present application is a continuation-in-part to U.S. patent application Ser. No. 12/948,051, filed Nov. 17, 2010.

BACKGROUND

The present disclosure relates to a gas turbine engine, and more particularly to an accessory gearbox therefor.

Aircraft powered by gas turbine engines often include a mechanically driven accessory gearbox to drive accessory systems such as fuel pumps, scavenge pumps, electrical generators, hydraulic pumps, etc. These components typically operate at different speeds from one another and require differing amounts of horsepower as provided by the accessory gearbox.

Conventional gas turbine engine accessory gearboxes utilize a gearbox case mountable underneath the engine. The gearbox case is typically crescent-shaped with forward and aft faces to which the accessory components are mounted. The accessory gearbox is driven by an angle gearbox through a layshaft which axially extends from the gearbox case. A towershaft driven by the engine high-pressure spool drives the layshaft through the angle gearbox.

SUMMARY

An accessory system for a gas turbine engine according to an exemplary aspect of the present disclosure includes a main case which defines an accessory gearbox axis. A cover is removably mountable to the main case and a first gear set at least partially within the cover along a first accessory axis transverse to the accessory gearbox axis.

An accessory system for a gas turbine engine according to an exemplary aspect of the present disclosure includes a main case which defines an accessory gearbox axis and a cover removably mountable to the main case. A first gear set with a first drive gear and a first spur gear mounted to a first shaft along a first accessory axis transverse to the accessory gearbox axis. A second gear set with a second drive gear and a second spur gear mounted to a second shaft along a second accessory axis transverse to the accessory gearbox axis, the second spur gear meshed with the first spur gear. A third gear set with a third drive gear and a third spur gear mounted to a third shaft along a third accessory axis transverse to the accessory gearbox axis, the third spur gear contained within the cover. A fourth gear set with a fourth spur gear mounted to a fourth shaft along a fourth accessory axis transverse to the accessory gearbox axis, the fourth spur gear meshed with the third spur gear, the fourth spur gear contained within the cover. A crossover gear set having a crossover drive gear mounted to a crossover shaft along the accessory gearbox axis, the crossover drive gear meshed with the first drive gear and the third drive gear.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
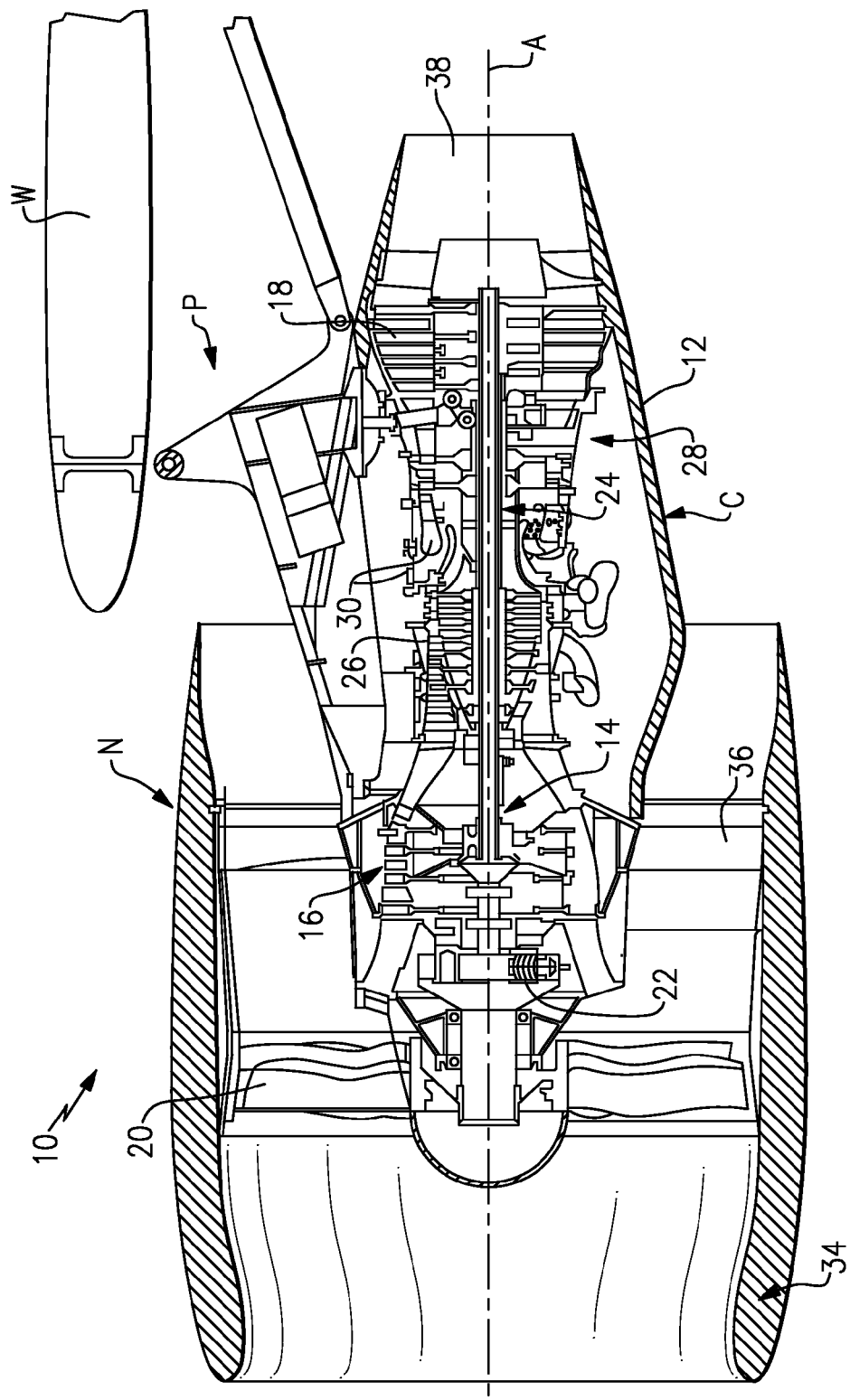
FIG. 1 is a general sectional view through a gas turbine engine along the engine longitudinal axis.

FIG. 1 illustrates a general partial fragmentary schematic view of a gas turbine engine 10 suspended from an engine pylon P within an engine nacelle assembly N as is typical of an aircraft designed for subsonic operation. The engine pylon P or other support structure is typically mounted to an aircraft wing W, however, the engine pylon P may alternatively extend from other aircraft structure such as an aircraft empennage.

The gas turbine engine 10 includes a core engine C within a core nacelle 12 that houses a low spool 14 and high spool 24 which rotate about an engine axis of rotation A. The low spool 14 includes a low pressure compressor 16 and low pressure turbine 18. The low spool 14 may drive a fan section 20 either directly or through a geared architecture 22. The high spool 24 includes a high pressure compressor 26 and high pressure turbine 28. A combustor 30 is arranged between the high pressure compressor 26 and high pressure turbine 28.

The engine 10 in the disclosed non-limiting embodiment is a high-bypass geared architecture aircraft engine with a bypass ratio greater than ten (10:1), a turbofan diameter significantly larger than that of the low pressure compressor 16, and a low pressure turbine 18 pressure ratio greater than 5:1. The geared architecture 22 may be an epicycle gear system such as a planetary gear system or other gear system with a gear reduction ratio of greater than 2.5:1.

It should be understood, however, that the above parameters are only exemplary of one embodiment of a geared architecture engine and that the present application is applicable to other gas turbine engines including direct drive turbofans.

Airflow that enters a fan nacelle 34 generates a high bypass flow arrangement with a bypass ratio in which approximately 80 percent of the airflow which enters the fan nacelle 34 may be considered bypass flow. The bypass flow communicates through a generally annular bypass flow path defined between the core nacelle 12 and the fan nacelle 34. A portion of the airflow that enters the fan nacelle 34, referred to as a core airflow, is compressed by the low pressure compressor 16 and the high pressure compressor 26, mixed and burned with the fuel in the combustor 30, then expanded over the high pressure turbine 28 and low pressure turbine 18. The turbines 28, 18 are coupled for rotation with, respectively, spools 24, 14 to rotationally drive the compressors 26, 16 and, through the optional geared architecture 22, the fan section 20 in response to the expansion. A core engine exhaust exits the core nacelle 12 through a core nozzle 38 defined between the core nacelle 12 and a tail cone 32.

Figure 2:
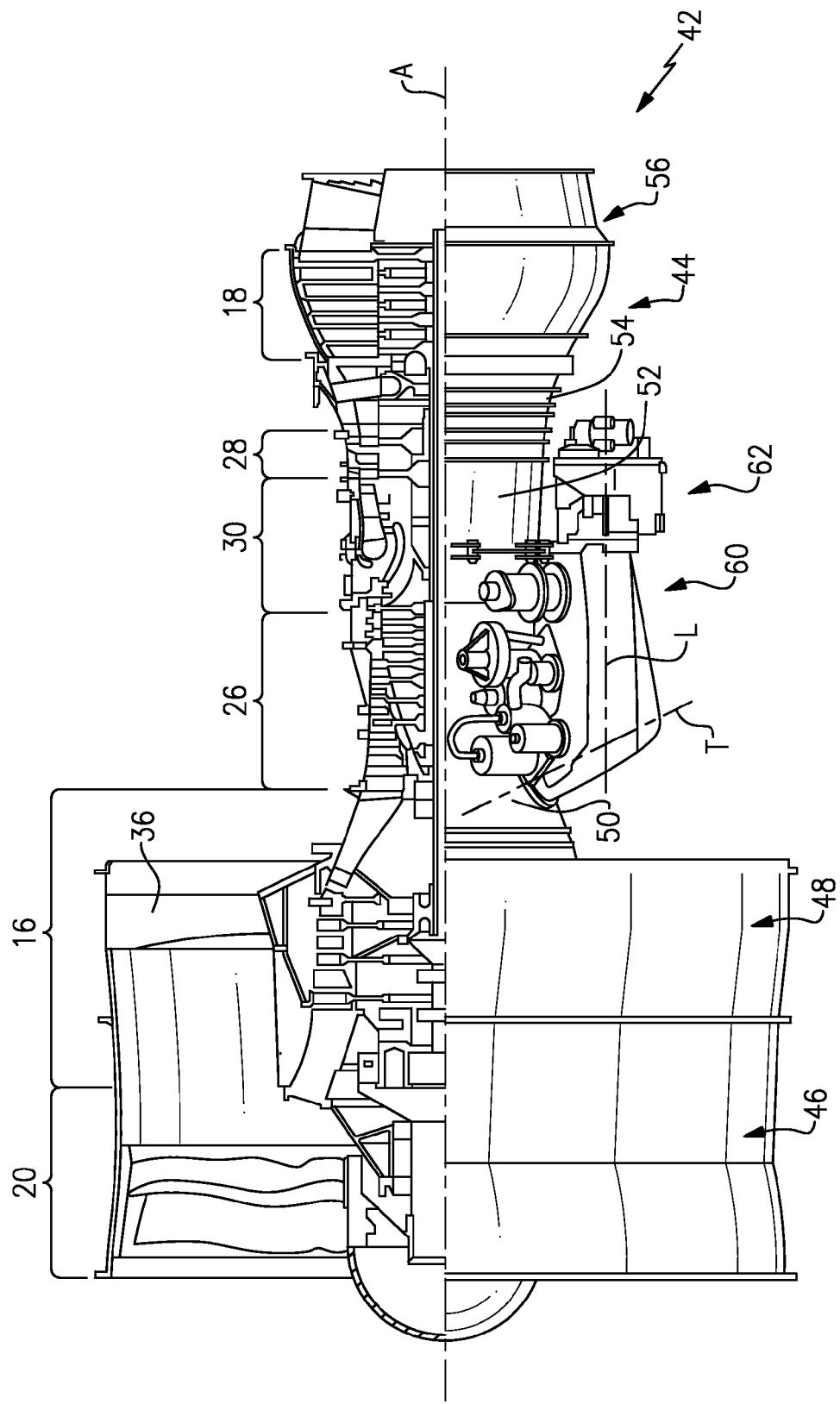
FIG. 2 is a general partial sectional view through a gas turbine engine along the engine longitudinal axis illustrating an engine static structure case arrangement on the lower half thereof with an accessory system mounted thereto.

Referring to FIG. 2, the engine static structure 42 includes core engine case structure 44 often referred to as an engine backbone. The engine case structure 44 generally includes sub-structures or modules, defined by, for example, a fan case 46, an intermediate case (IMC) 48, a high pressure compressor case 50, a diffuser case 52, a low pressure turbine case 54, and a turbine exhaust case 56. The core engine case structure 44 is secured to the fan case 46 at the IMC 48 which includes a multiple of circumferentially spaced radially extending fan exit guide vanes (FEGVs) 36.

Figure 3:
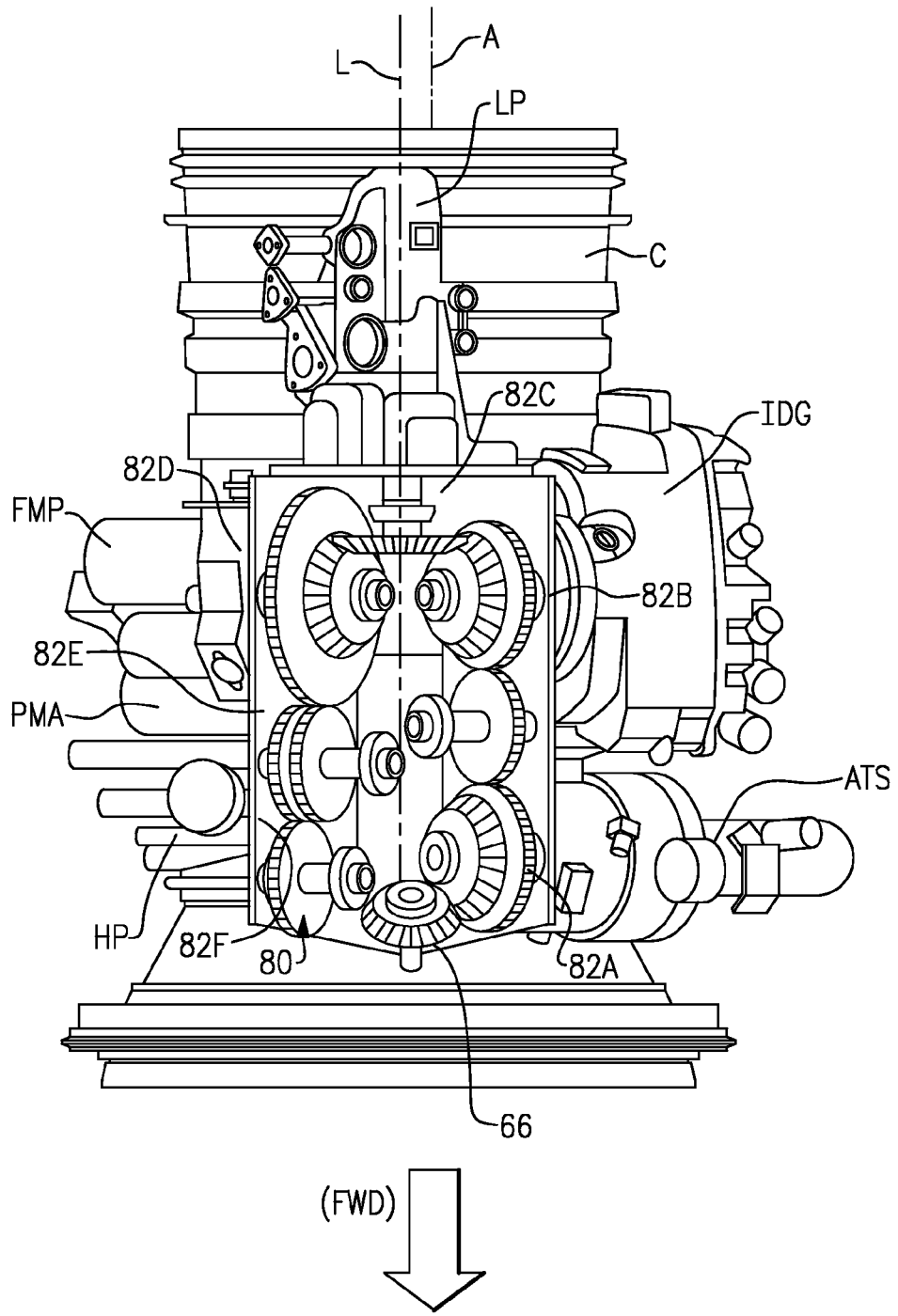
FIG. 3 is a general phantom bottom view of an accessory system with a multiple of accessory components mounted thereto.

An accessory system 60 is axially mounted to the case structure 44 along an accessory gearbox axis L generally parallel to the engine axis of rotation A. The accessory system 60 takes advantage of the significant axial area within the core nacelle C (FIG. 1) to support accessory components (ACs) such as, for example, an Air Turbine Starter (ATS), a deoiler (D), a hydraulic pump (HP), a lube pump (LP), an integrated drive generator (IDG), a permanent magnet alternator (PMA), a fuel pump module (FMP), and others transverse to the accessory gearbox axis L (FIG. 3). It should be understood, that any number and type of accessory components AC may alternatively or additionally be provided.

Figure 4:
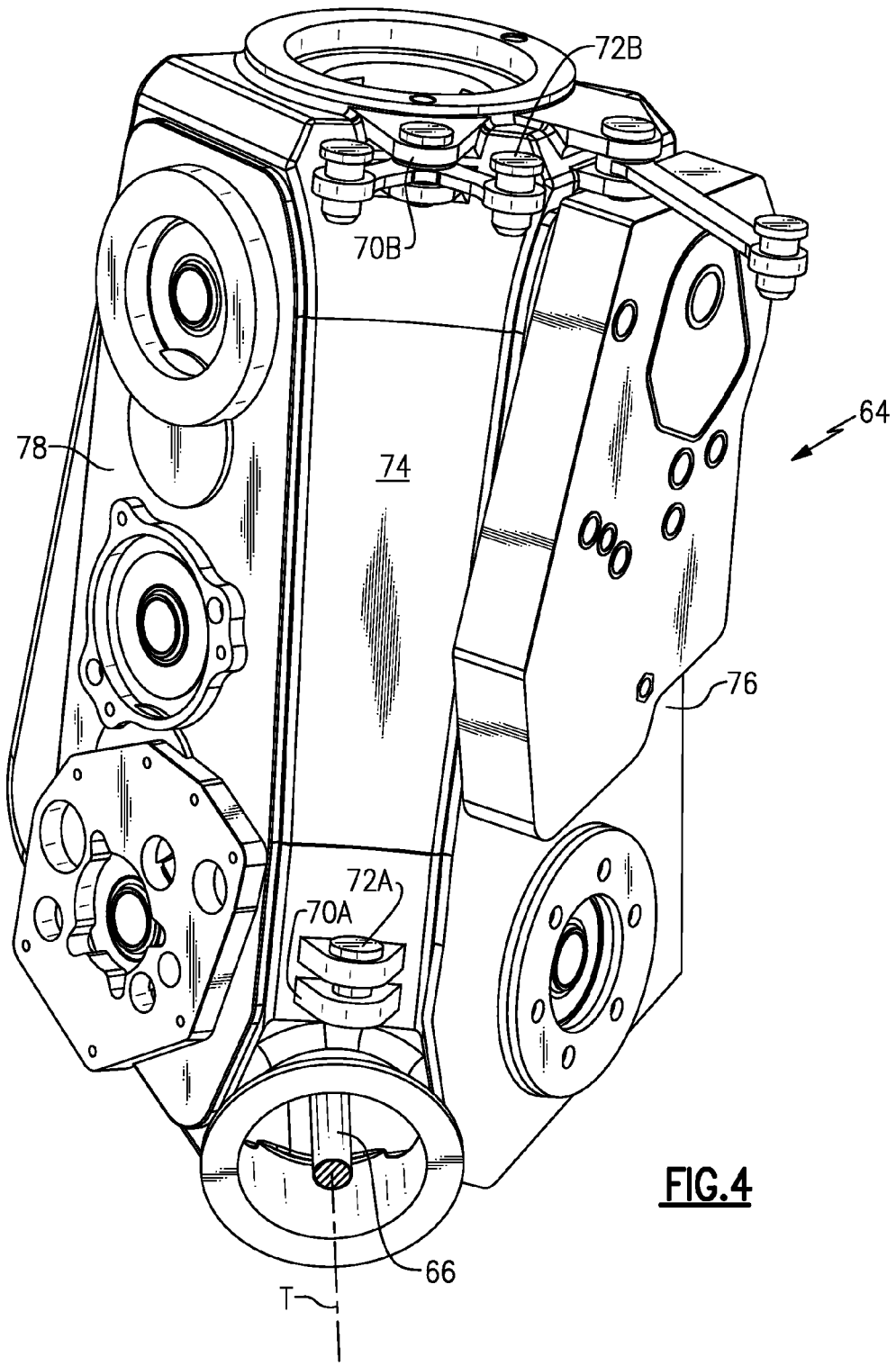
FIG. 4 is a perspective top view of the accessory system with a side cover removed without the multiple of accessory components mounted thereto.

With reference to FIG. 4, the accessory system 60 includes an axial housing assembly 64 which receives a towershaft 66. That is, the axial housing assembly 64 provides integral support for the towershaft 66 which otherwise conventionally required a separate angled gearbox housing which extends from the conventionally crescent shaped accessory gearbox. The towershaft 66 defines a towershaft axis of rotation T generally transverse to the engine axis of rotation A. It should be understood that the towershaft 66 is typically driven by the high spool 24. Various towershaft 66 arrangements will benefit herefrom.

The axial housing assembly 64 generally includes a main case 74, a cover 76, and a cover 78 opposite cover 76. The main case 74 may include support points 70A, 70B for attachment to the engine case structure 44 through a multiple of links 72A, 72B which constrain relative movement of the axial housing assembly 64 in six-degrees of freedom. It should be understood that various attachment arrangements may additionally or alternatively be provided.

Figure 5:
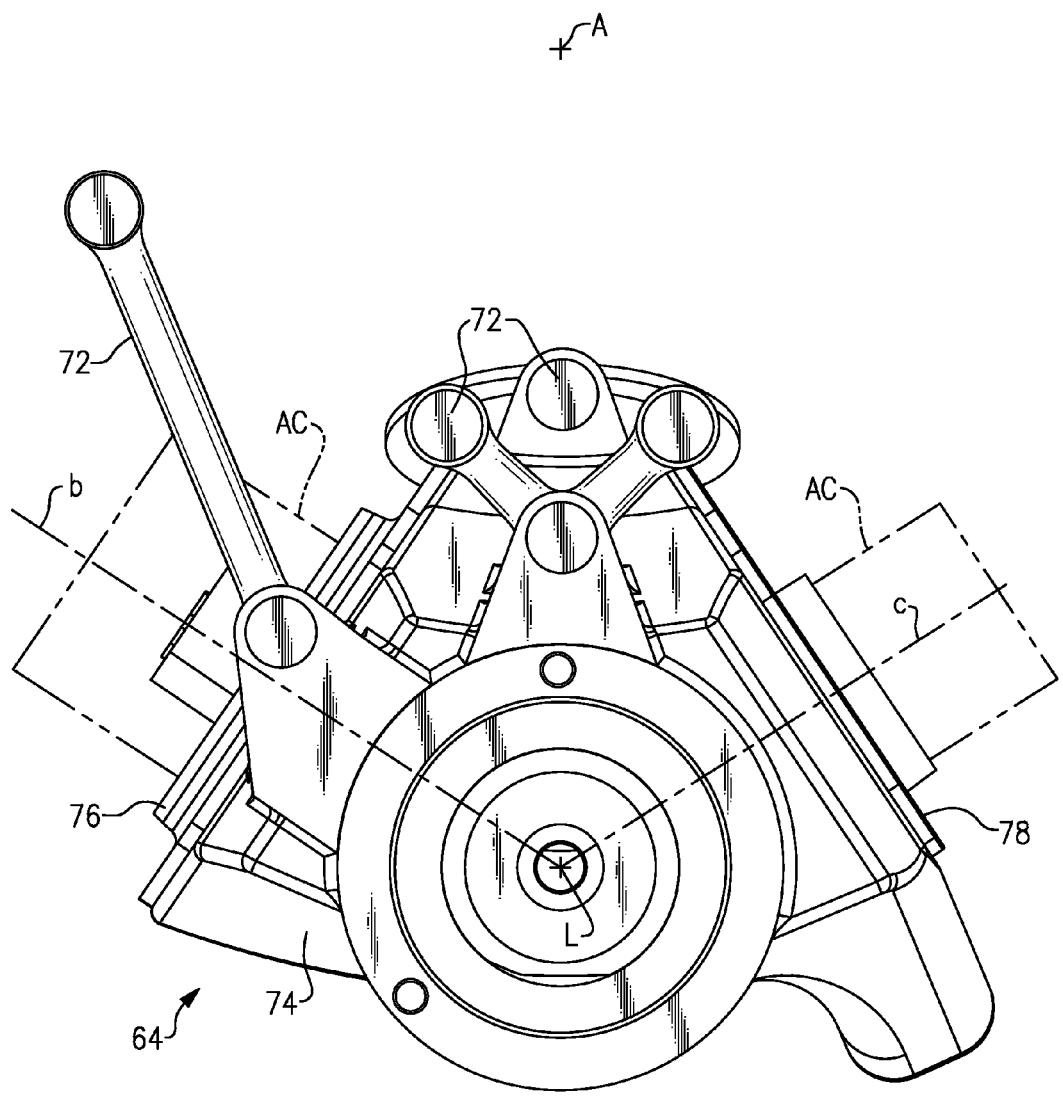
FIG. 5 is a perspective rear view of the accessory system without the multiple of accessory components mounted thereto.

With reference to FIG. 5, the covers 76, 78 define angled, non-parallel sides of the axial housing assembly 64. The covers 76, 78 are removable to access a geartrain 80 (FIG. 3). It should be understood that various covers and access panels may alternatively or additionally be provided.

Figure 6:
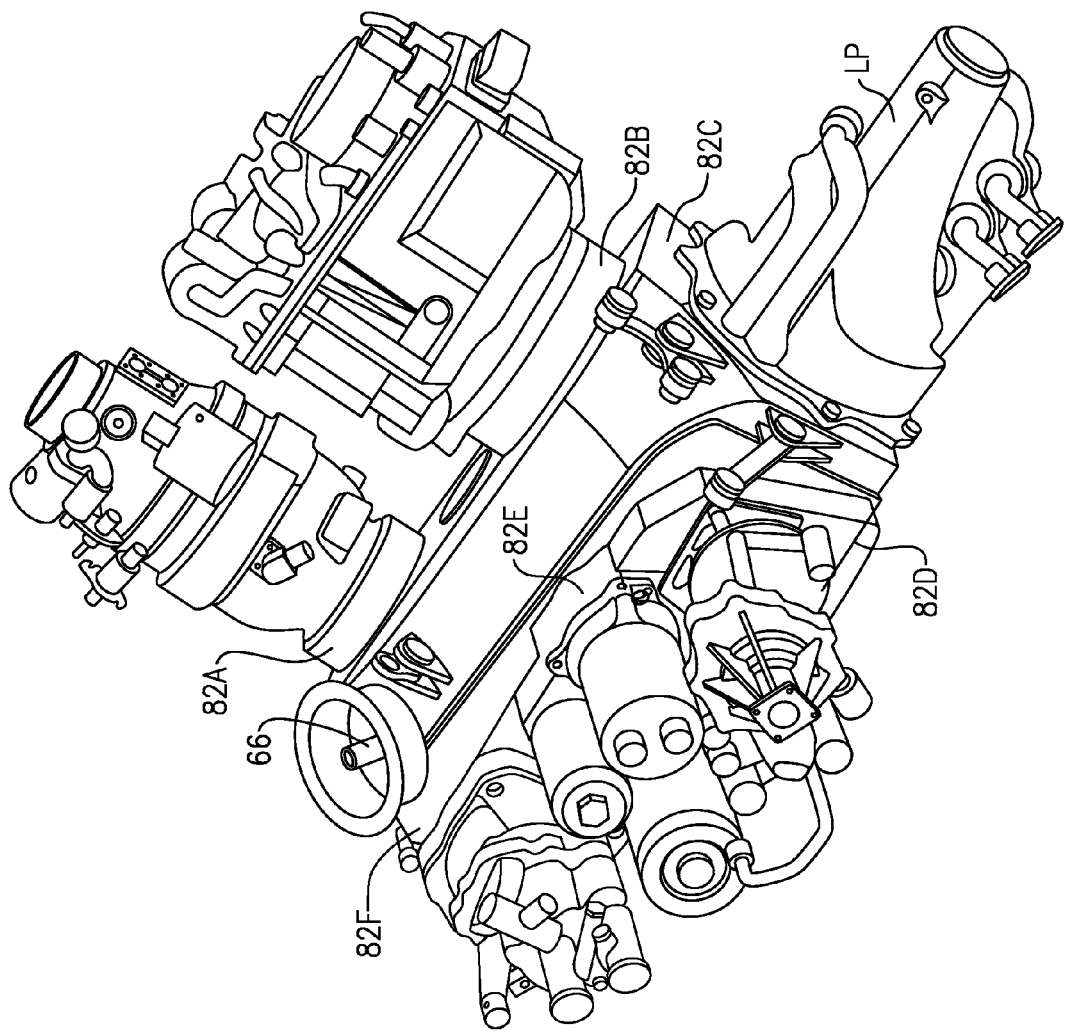
FIG. 6 is a perspective top view of an accessory system with the multiple of accessory components mounted thereto.

The covers 76, 78 define an accessory component pad 82A-82E to which each associated accessory component (AC) is mounted. The accessory component pads 82A-82E facilitate a V-orientation of the accessory components (AC) (FIG. 6) with respect to the main case 74 to essentially straddle the engine case structure 44. That is, a mounting axis b of each accessory component (AC) on cover 76 and a mounting axis c of each accessory component (AC) on cover 78 define the V-orientation with respect to the accessory gearbox axis L to straddle the engine axis of rotation A. This orientation provides a significant removability envelope for each accessory component (AC) as each accessory component (AC) extends in a radial outboard direction with regard to the accessory gearbox axis L.

Figure 7:
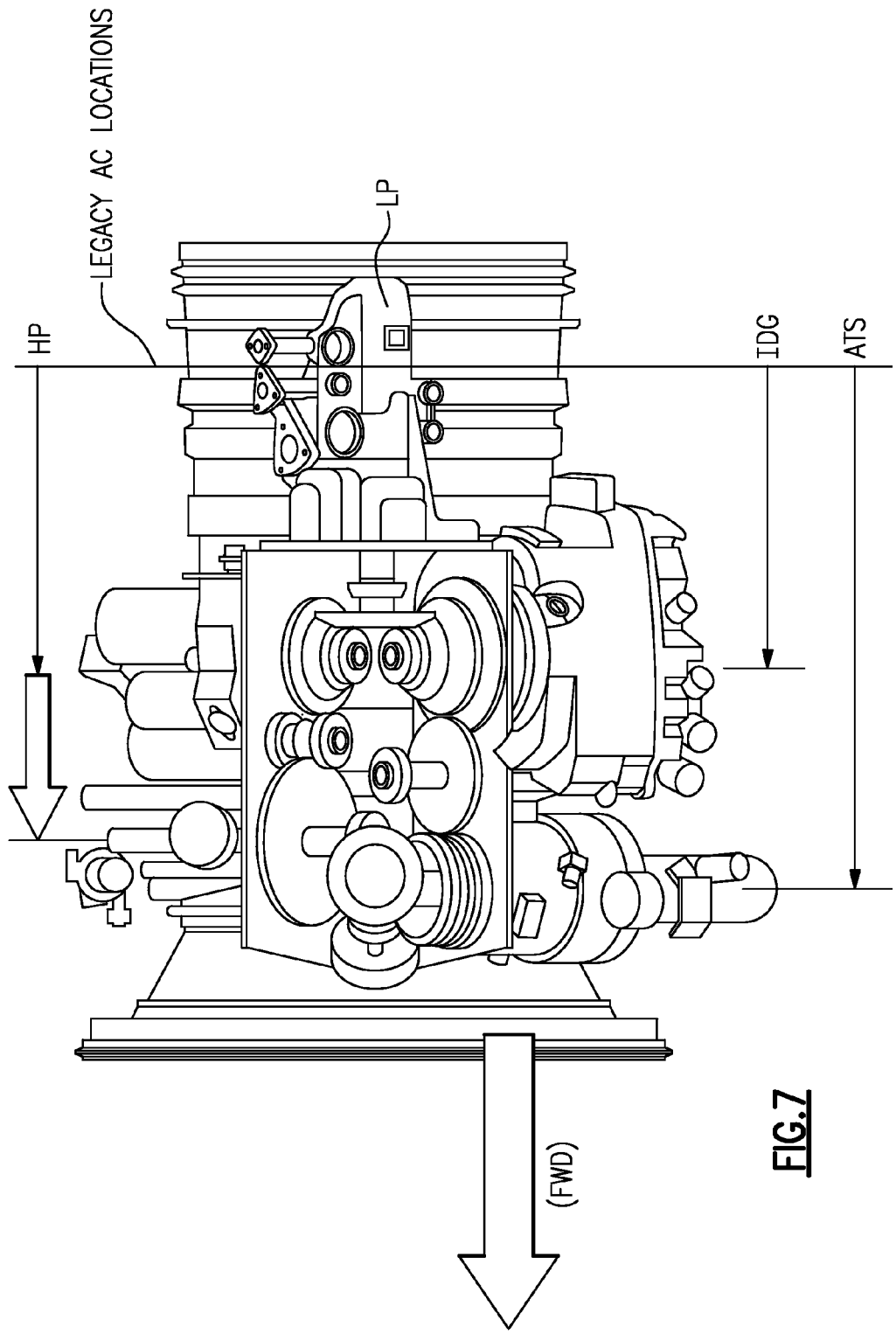
FIG. 7 is a schematic bottom view of an accessory system with a multiple of accessory components mounted thereto illustrating the accessory component position relative to legacy locations.

The accessory system 60 facilitates location of the accessory components (AC) relatively forward within the core nacelle 12 which provides a relatively lower temperature operating environment (FIG. 7). Reliability of the accessory components (AC) is improved by an order of magnitude due to location in a cooler environment. The location of the accessory components (AC) also facilitates service line routes which typically require a relatively large bend radius.

In one non-limiting embodiment, the lube pump (LP) is mounted along the accessory gearbox axis L. That is, the accessory gearbox axis L may be in line with the input axis of rotation for the lube pump (LP). The Air Turbine Starter (ATS) and the hydraulic pump (HP) are mounted in the forward most positions which provides the coolest environment for the accessory components.

Figure 8:
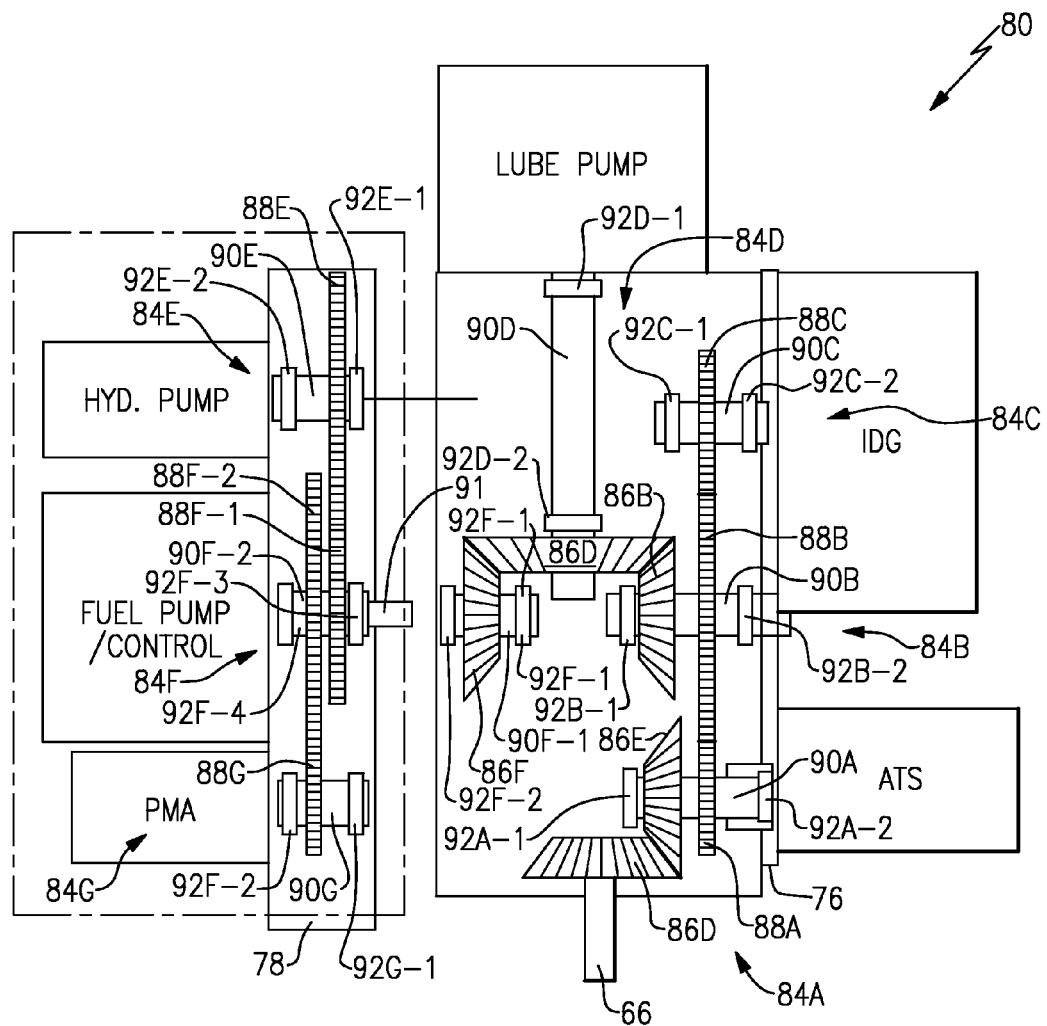
FIG. 8 is a schematic view of a gear system within the accessory system according to one non-limiting embodiment.

With reference to FIG. 8, the geartrain 80 defines a multiple of gear sets 84A-84G which may include respective spur gears 86A-F, drive gears 88A-88G and shafts 90A-90G. It should be understood that although seven gear sets 84A-84G are illustrated in the disclosed, non-limiting embodiment, any number of gear sets will benefit herefrom. In this non-limiting embodiment, first gear set is gear set 84A, second gear set is gear set 84B, third gear set is gear set 84F, fourth gear set is gear set 84G, fifth gear set is gear set 84E, sixth gear set is gear set 84C, and seventh gear set is gear set 84D.

The drive gears 86A, 86B, 86D, 86F and spur gears 88A-88G may be keyed to the respective shafts 90A-90E for rotation therewith. The drive gears 86A-86F receive and transfer power from the towershaft 66 that drives spur gear 86D. Each drive gear 86A-F may be a bevel gear mounted upon the respective shaft 90A-90E with a corresponding spur gear 88A-88G. The relative size of the spur gears 88A-88G drives each accessory component (AC) at the proper speed. The drive gears 86A, 86B, 86C, 86D, 86E, 86F are relatively more expensive to manufacture and heavier than the drive gears 88A-88G such that their usage is minimized while the multitude of drive gears 88A-88E provide for the desired speed ratio between each accessory component (AC) with minimal weight and expense.

Each of the shafts 90A-90G may be supported within the axial housing assembly 64 upon a respective bearing set 92A-92G. One bearing of each bearing set 92A-92G may be located adjacent each end of the shaft 90A-90G such that the drive gears 86A-86E and/or spur gears 88A-88G are located therebetween. The shafts 90A-90C are located along respective mounting axes b of each accessory component (AC) on cover 76 while shafts 90E-90G are located along the mounting axes c of each respective accessory component (AC) on cover 78 to define the V-orientation with respect to the accessory gearbox axis L.

The gear sets 84E-84G are located at least partially within cover 78. That is, the shafts 90E-90G, bearing sets 92E-92G and associated spur gears 88E-88G are supported within cover 78 such that cover 78 may be selectively removed together as a unit. Although cover 78 is illustrated as the removable cover which contains the gear sets 84E-84G, it should be understood that either or both covers 76, 78 of the axial housing assembly 64 may contain their respective gear sets. In an alternate embodiment, the wall opposite the removable cover is integral with the main case 74.

In the disclosed non-limiting embodiment, the shaft 90F is separable into a shaft portion 90E-1 and a shaft portion 90E-2 such that cover 78 is readily removable with gear sets 84E, 84F, 84G. Shaft portion 90E-1 supports the drive gear 86F within the main case 74 upon bearings 92F-1, 92F-2. Shaft portion 90E-2 is supported within the cover 78 upon bearings 92F-3 and 92F-4. Shaft portion 90E-1 and shaft portion 90E-2 include an interface 91 such as a splined interface to facilitate ready removal of cover 78.

The accessory components (AC) mounted to cover 76 are interconnected with the accessory components mounted to cover 78 through a crossover gear set 92 generally along the accessory gearbox axis L which, in the disclosed non-limiting embodiment, drives the lube pump (LP) and is transverse to both axes b, c. Location of the lube pump (LP) generally along the accessory gearbox axis L facilitates, for example, scavenge flow.

The crossover gear set 92 includes drive gear 86D in meshed engagement with drive gear 86B and 86F which respectively connect, in the disclosed non-limiting embodiment, the integrated drive generator (IDG), and the fuel pump module (FMP). The crossover gear set 92 avoids the heretofore necessity of a layshaft which thereby increases reliability and reduces gearbox size. Typically, the higher power requirement accessory components (AC) such as the Air Turbine Starter (ATS) are located upstream relative the towershaft 66 and the lower power requirement accessory components (AC) such as the Permanent Magnet Alternator (PMA) are located further downstream.

In one non-limiting embodiment, the towershaft 66 drives the towershaft drive gear 66D that is in meshing engagement with the drive gear 86A of gear set 84A which, in the disclosed non limiting embodiment, drives the Air Turbine Starter (ATS). Gear set 84A drives gear set 84B through the meshed spur gears 88A, 88B. Gear set 84B may be considered an idler gear set which does not directly drive an accessory component (AC) but transfers power to gear set 84C and provides the desired gear ratio.

The crossover gear set 92—herein identified as gear set 84D—interconnects gear set 84C and gear set 84E. The drive gear 86D of the crossover gear set 92 is located outboard of the drive gears 86B, 86E to facilitate a relatively short shaft 90D which minimizes weight.

The drive gear 86D of gear set 84D which, in the disclosed non-limiting embodiment, drives the hydraulic pump (HP). The spur gear 88E of gear set 84E is in meshing engagement with the spur gear 88F of gear set 84F which in turn is in meshing engagement with the spur gear 88G of gear set 84G which respectively drive the fuel pump module (FMP) and the permanent magnet alternator (PMA). Gear set 84F may include multiple spur gears 88F-1, 88F-2 to provide the desired gear ratio change between gear set 84E and gear set 84G.

Figure 9:
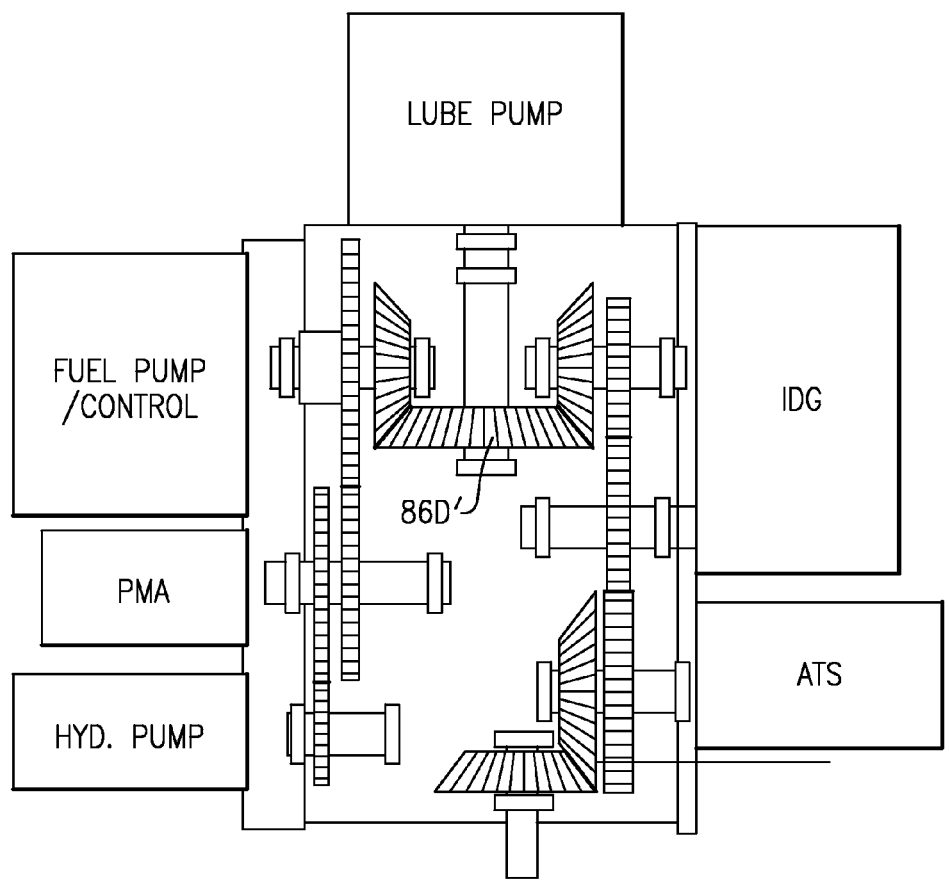
FIG. 9 is a schematic view of a gear system within the accessory system according to another non-limiting embodiment.
Figure 10:
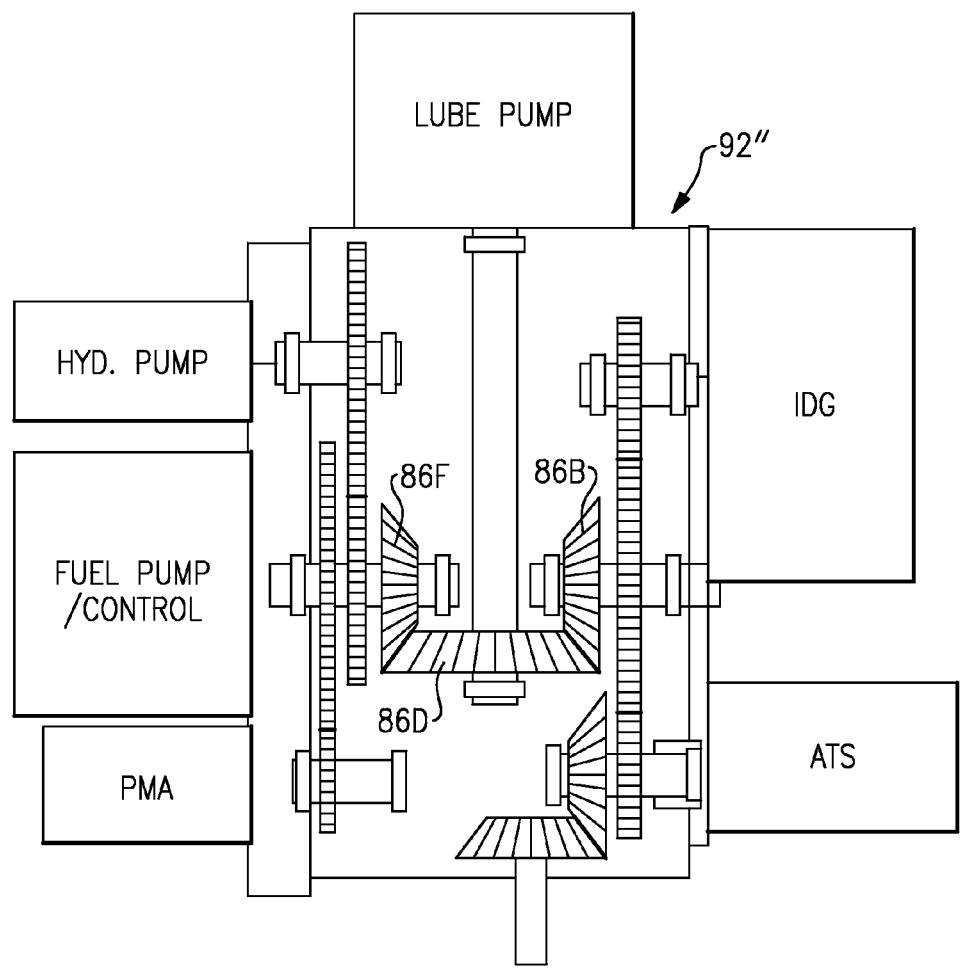
FIG. 10 is a schematic view of a gear system within the accessory system according to yet another non-limiting embodiment.

In an alternate embodiment (FIG. 9), the drive gear 86D' of the crossover gear set 92' is located inboard of the drive gears 86B, 86F which results in a relatively longer shaft 90D' but facilitates, for example, balance of the overhung moment such as the relatively large lube pump (LP) through displacement of the bearing 92D-1 toward the center of the gearbox housing.

The accessory system 60 reduces component complexity, part count, and weight through elimination of bolted flanges and additional structure typical of a separate angled gearbox housing. This integration is best implemented for accessory gearboxes mounted close to the engine case, and in the case of this disclosure, gearboxes which are axially-oriented.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An accessory system for a gas turbine engine comprising:
a main case which defines an accessory gearbox axis;
a cover removably mountable to said main case; a first gear set at least partially within said cover along a first accessory axis transverse to said accessory gearbox axis,
a tower shaft driving said first gear set,
a second gear set along a second accessory axis transverse to said accessory gearbox axis, said second gear set driven by said first gear set said second gear set arranged downstream of said first gear set wherein said first gear set and said second gear set are on a first mounting axis;
a third gear set on a second mounting axis and,
a crossover gear set generally along said accessory gearbox axis, said crossover gear set interconnects said second gear set and said third gear set.

2. The accessory system as recited in claim 1, wherein said first gear set includes a shaft separable into a first shaft portion supported within said cover and second shaft portion supported within said main case.

3. The accessory system as recited in claim 2, further comprising a splined interface between said first shaft portion and said second shaft portion.

4. The accessory system as recited in claim 2, further comprising a drive gear mounted to said second shaft portion.

5. The accessory system as recited in claim 4, further comprising a spur gear mounted to said first shaft portion, said spur gear supported by a bearing set mounted within said cover.

6. The accessory system as recited in claim 1, wherein said accessory gearbox axis is parallel to a gas turbine engine axis of rotation.

7. The accessory system as recited in claim 1, wherein said first accessory axis is transverse to a gas turbine engine axis of rotation.

8. The accessory system as recited in claim 1, wherein said first gear set drives a first accessory component removably mounted to said cover.

9. The accessory system as recited in claim 1, wherein said first accessory axis and said second accessory axis defines a V-orientation.

10. The accessory system as recited in claim 1, wherein said first gear set drives a first accessory component removably mounted to said cover.

11. The accessory system as recited in claim 9, wherein said second gear set drives a second accessory component removably mounted to a second removable cover of said accessory gearbox.

12. The accessory system of claim 1 further comprising:
a fourth gear set upstream of and driven by said third gear set and mounted on said second mounting axis.

13. The accessory system of claim 1 further comprising:
a fifth gear set upstream of and driven by said third gear set and mounted on said second mounting axis.

14. The accessory system of claim 1 further comprising:
a sixth gear set downstream of and driven by said second gear set and mounted on said first mounting axis.

15. The accessory system of claim 1 wherein said tower shaft enters said main case at an upstream end thereof between said first mounting axis and said second mounting axis.

16. The accessory system of claim 15 further comprising a seventh gear set mounted at a downstream end of said case, said seventh gear set driven by said cross-over gear set.

17. The accessory system of claim 1 further comprising a seventh gear set mounted at a downstream end of said main case, said seventh gear set driven by said cross-over gear set.

18. The accessory system of claim 17 wherein said seventh gear set is mounted on said main case between said first mounting axis and said second mounting axis.

* * * * *